(12) United States Patent
Hasegawa

(10) Patent No.: US 8,891,109 B2
(45) Date of Patent: Nov. 18, 2014

(54) PRINTING DEVICE CAPABLE OF DISPLAYING THUMBNAIL IMAGE OF IMAGE FILE

(75) Inventor: Tomohiko Hasegawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 304 days.

(21) Appl. No.: 12/626,184

(22) Filed: Nov. 25, 2009

(65) Prior Publication Data

US 2010/0134836 A1    Jun. 3, 2010

(30) Foreign Application Priority Data

Nov. 28, 2008   (JP) ................ 2008-304803

(51) Int. Cl.
  *G06F 15/00*   (2006.01)
  *H04N 1/00*    (2006.01)
(52) U.S. Cl.
  CPC ...... *H04N 1/0044* (2013.01); *H04N 2201/0094* (2013.01); *H04N 2201/0089* (2013.01); *H04N 2201/0067* (2013.01); *H04N 1/00461* (2013.01); *H04N 2201/0087* (2013.01); *H04N 1/00442* (2013.01); *H04N 1/00283* (2013.01); *H04N 1/00453* (2013.01); *H04N 1/00448* (2013.01); *H04N 1/00347* (2013.01)
  USPC .......... 358/1.15; 382/254; 353/122; 347/251; 348/333.01; 348/220.1; 358/1.17; 358/1.18; 358/527
(58) Field of Classification Search
  USPC ........... 358/1.1, 1.12; 348/14.07, 333.05, 345
  See application file for complete search history.

(56) References Cited

U.S. PATENT DOCUMENTS

| 5,404,316 | A | | 4/1995 | Klingler et al. |
| 5,689,610 | A | * | 11/1997 | Manico et al. ................ 386/200 |
| 5,706,097 | A | * | 1/1998 | Schelling et al. ............. 358/296 |

(Continued)

FOREIGN PATENT DOCUMENTS

| EP | 1973328 A1 | 9/2008 |
| JP | H01-081574 | 3/1989 |

(Continued)

OTHER PUBLICATIONS

European Official Action dated Mar. 4, 2013 from related European Patent Application 09014747.1.

(Continued)

*Primary Examiner* — King Poon
*Assistant Examiner* — Ted Barnes
(74) *Attorney, Agent, or Firm* — Scully, Scott, Murphy & Presser, P.C.

(57) ABSTRACT

An image processing apparatus comprising an retrieving unit configured to retrieve a first image file representing a motion image and a second image file representing a still image, a display image file generating unit configured to generate, from the first image file, a first single display image file comprising a plurality of frame images extracted from the first image file; a display control unit configured to display the first single display image file and a second single display image file adjacent to each other, the second single display image file comprising the still image represented by the second image file; a selection accepting unit configured to accept a selection of one from among the first single display image file and the second single display image; and a printing data generation unit configured to generate print data to be used for printing based upon the selection.

14 Claims, 10 Drawing Sheets

(56) References Cited

U.S. PATENT DOCUMENTS

| | | | |
|---|---|---|---|
| 5,963,204 A * | 10/1999 | Ikeda et al. ............... 715/723 |
| 6,028,603 A * | 2/2000 | Wang et al. ............... 715/776 |
| 6,453,078 B2 * | 9/2002 | Bubie et al. ............... 382/305 |
| 6,456,391 B1 * | 9/2002 | Miyamoto et al. ........... 358/1.18 |
| 6,456,779 B1 | 9/2002 | Saib |
| 6,657,637 B1 | 12/2003 | Inagaki et al. |
| 6,701,011 B1 | 3/2004 | Nakajima |
| 6,795,212 B1 | 9/2004 | Ichikawa |
| 6,807,361 B1 | 10/2004 | Girgensohn et al. |
| 6,816,552 B2 | 11/2004 | Demos |
| 6,903,760 B2 * | 6/2005 | McFarland et al. .......... 347/225 |
| 6,945,716 B2 * | 9/2005 | Kawamoto ................ 400/62 |
| 7,145,601 B2 * | 12/2006 | Misawa et al. ........... 348/333.05 |
| 7,196,727 B2 | 3/2007 | Sato |
| 7,266,150 B2 | 9/2007 | Demos |
| 7,277,192 B2 * | 10/2007 | Kotani et al. ............... 358/1.13 |
| 7,313,280 B2 | 12/2007 | Murai et al. |
| 7,447,992 B2 * | 11/2008 | Kawabata ............... 715/243 |
| 7,495,795 B2 * | 2/2009 | Graham et al. ............. 358/1.18 |
| 7,511,849 B2 | 3/2009 | Matsuhira |
| 7,540,011 B2 * | 5/2009 | Wixson et al. .............. 725/52 |
| 7,656,451 B2 * | 2/2010 | Yanagi ................. 348/333.11 |
| 7,720,349 B2 * | 5/2010 | Ogikubo ............... 386/278 |
| 7,760,956 B2 * | 7/2010 | Lin et al. ............... 382/254 |
| 7,839,512 B2 * | 11/2010 | Kotani et al. ............. 358/1.13 |
| 7,911,511 B2 * | 3/2011 | Yoshikawa et al. ....... 348/231.99 |
| 7,954,056 B2 * | 5/2011 | Graham ................ 715/716 |
| 8,094,990 B2 * | 1/2012 | Ichikawa ............... 386/200 |
| 8,149,286 B2 * | 4/2012 | Takagi et al. ............ 348/222.1 |
| 8,150,194 B2 | 4/2012 | Fujibayashi et al. |
| 8,185,842 B2 * | 5/2012 | Chang et al. .............. 715/776 |
| 8,249,397 B2 * | 8/2012 | Wood et al. .............. 382/305 |
| 8,311,393 B2 * | 11/2012 | Kawaoka ............... 386/288 |
| 8,332,757 B1 | 12/2012 | Davey et al. |
| 2002/0048043 A1 | 4/2002 | Takahashi et al. |
| 2002/0126318 A1 * | 9/2002 | Katayama ............. 358/402 |
| 2003/0107767 A1 * | 6/2003 | Ishizaki ............. 358/1.18 |
| 2003/0112871 A1 | 6/2003 | Demos |
| 2003/0142199 A1 * | 7/2003 | McFarland et al. .......... 347/251 |
| 2003/0184826 A1 | 10/2003 | Takemoto et al. |
| 2003/0231862 A1 * | 12/2003 | Kawaoka ............. 386/52 |
| 2004/0005004 A1 | 1/2004 | Demos |
| 2004/0226467 A1 * | 11/2004 | Underwood et al. ......... 101/484 |
| 2004/0247199 A1 | 12/2004 | Murai et al. |
| 2005/0002063 A1 * | 1/2005 | Hanamoto .............. 358/1.18 |
| 2005/0033758 A1 | 2/2005 | Baxter |
| 2005/0097475 A1 * | 5/2005 | Makioka et al. ............. 715/792 |
| 2005/0134946 A1 * | 6/2005 | Tsue et al. ............. 358/537 |
| 2005/0185201 A1 | 8/2005 | Kuwata |
| 2005/0237588 A1 * | 10/2005 | Gohara et al. ............. 358/538 |
| 2006/0132637 A1 * | 6/2006 | Imanura ............... 348/333.01 |
| 2006/0288304 A1 | 12/2006 | Nomoto et al. |
| 2007/0003222 A1 * | 1/2007 | Shingai .............. 386/95 |
| 2007/0053668 A1 * | 3/2007 | Misawa et al. ........... 386/121 |
| 2007/0070442 A1 * | 3/2007 | Ohkubo .............. 358/451 |
| 2007/0073777 A1 * | 3/2007 | Werwath et al. ........ 707/104.1 |
| 2007/0146504 A1 * | 6/2007 | Morimoto et al. ......... 348/231.3 |
| 2007/0174782 A1 * | 7/2007 | Russo ............... 715/781 |
| 2007/0223049 A1 * | 9/2007 | Araya et al. ............. 358/302 |
| 2007/0258655 A1 * | 11/2007 | Motominami .......... 382/254 |
| 2007/0285573 A1 * | 12/2007 | Ichikawa ............. 348/571 |
| 2008/0066016 A1 | 3/2008 | Dowdy et al. |
| 2008/0088706 A1 | 4/2008 | Girgensohn et al. |
| 2008/0126152 A1 * | 5/2008 | Villanueva et al. ........... 705/7 |
| 2008/0151317 A1 | 6/2008 | Imine |
| 2008/0174747 A1 * | 7/2008 | Fujinawa et al. ........... 353/122 |
| 2008/0231741 A1 * | 9/2008 | McIntyre et al. ........ 348/333.01 |
| 2009/0009530 A1 | 1/2009 | Araki et al. |
| 2009/0080020 A1 * | 3/2009 | Kitagawa ............... 358/1.15 |
| 2009/0086044 A1 * | 4/2009 | Kinemura ............. 348/220.1 |
| 2009/0116811 A1 * | 5/2009 | Kukreja et al. ............. 386/52 |
| 2009/0316056 A1 | 12/2009 | Rosencwaig et al. |

FOREIGN PATENT DOCUMENTS

| | | | | |
|---|---|---|---|---|
| JP | 2000-98514 | | 4/2000 | |
| JP | 2001-197445 | | 7/2001 | |
| JP | 2003-299001 | | 10/2003 | |
| JP | 2004-64231 | | 2/2004 | |
| JP | 2004064231 A | * | 2/2004 | ............... H04N 5/91 |
| JP | 2004-282377 A | | 10/2004 | |
| JP | 2005-130254 | | 5/2005 | |
| JP | 2005-160020 A | | 6/2005 | |
| JP | 2006-011754 | | 1/2006 | |
| JP | 2006-513592 A | | 4/2006 | |
| JP | 2007-110224 | | 4/2007 | |
| JP | 2007-221301 | | 8/2007 | |
| JP | 2007-266862 | | 10/2007 | |
| JP | 2008-022482 | | 1/2008 | |
| JP | 2008022482 A | * | 1/2008 | |
| JP | 4081736 | | 2/2008 | |
| JP | 2008-80522 | | 4/2008 | |
| JP | 2008-271594 A | | 11/2008 | |

OTHER PUBLICATIONS

United States Official Action dated Mar. 6, 2012 received in related U.S. Appl. No. 12/626,165.
U.S. Office Action dated Aug. 17, 2012, received in related U.S. Appl. No. 12/626,176.
Japanese Official Action dated Jul. 27, 2010 with English translation.
Chinese Official Action mailed Aug. 31, 2011 in corresponding Chinese Patent Application No. 200910225847.9 of related U.S. Appl. No. 12/626,184, together with an English language translation.
Extended European Search Report dated Nov. 5, 2010.
Japanese Office Action dated Feb. 5, 2013 issued in related Japanese Patent Application 2009-158008.
U.S. Official Action dated Apr. 10, 2013 from related U.S. Appl. No. 12/626,176, filed Nov. 25, 2009.
Office Action dated Sep. 7, 2012 received in a related U.S. Appl. No. 12/626,165.
Japanese Official Action dated Sep. 7, 2010 with English translation.
Japanese Office Action dated May 7, 2013 issued in JP 2009-158008 filed Apr. 22, 2013.
Japanese Official Action mailed Dec. 7, 2010 in corresponding Japanese Patent Application No. 2008-304804 of related U.S. Appl. No. 12/626,176, together with an English language translation.
English-language Abstract Japanese Patent Publication No. 2001-078127, dated Mar. 23, 2001.
U.S. Office Action dated Nov. 7, 2012 in related U.S. Appl. No. 12/817,713.
U.S. Office Action dated Oct. 1, 2013 from related U.S. Appl. No. 12/626,165.
U.S. Office Action dated Sep. 23, 2013 from related U.S. Appl. No. 12/817,713.
Notice of Allowance dated Sep. 25, 2013 from related U.S. Appl. No. 12/626,176.
Notice of Allowance dated Apr. 15, 2014 received in a related U.S. Appl. No. 12/817,713.
U.S. Office Action dated Mar. 7, 2014 from related U.S. Appl. No. 12/626,165.
European Office Action issued to the corresponding European Patent Application No. 09014747.1 dated Jun. 25, 2014.
U.S. Official Action dated Sep. 16, 2014 from related U.S. Appl. No. 12/626,165.

* cited by examiner

FIG.4

| 51 | 52 | 53 |
|---|---|---|
| 0 | "IMG01.jpg" | 2885 |
| 1 | "IMG02.avi" | 18000 |
| 2 | "IMG03.mov" | 58763 |
| 3 | "IMG04.jpg" | 4381 |

| | | |
|---|---|---|
| 0 | | | ～61
| 1 | | | ～62
| 640 | | | ～63
| 480 | | | ～64
| 1060 | | | ～65
| 1080000 | 7520000 | 14200000 |
| 20640000 | 27100000 | 33640000 |
| 40200000 | 46300000 | 53090000 |
| 40500 | 37650 | 43200 |
| 38900 | 26000 | 32700 |
| 36690 | 29290 | 41810 |

| FORMAT NAME | ASSIGNED NUMBER |
|---|---|
| AVI FORMAT | 0 |
| MOV FORMAT | 1 |
| MPEG FORMAT | 2 |

FIG.6B

| CODEC NAME | ASSIGNED NUMBER |
|---|---|
| MotionJPEG CODEC | 0 |
| MPEG1 CODEC | 1 |
| DivX CODEC | 2 |

FIG.7

| 71 | 72 | 73 | 74 | 75 |
|---|---|---|---|---|
| 0 | 0 | 0 | 30 | 30 |
| 1 | 0 | 1 | 210 | 30 |
| 2 | 0 | 2 | 390 | 30 |
| 3 | 1 | 0 | 30 | 30 |

~38

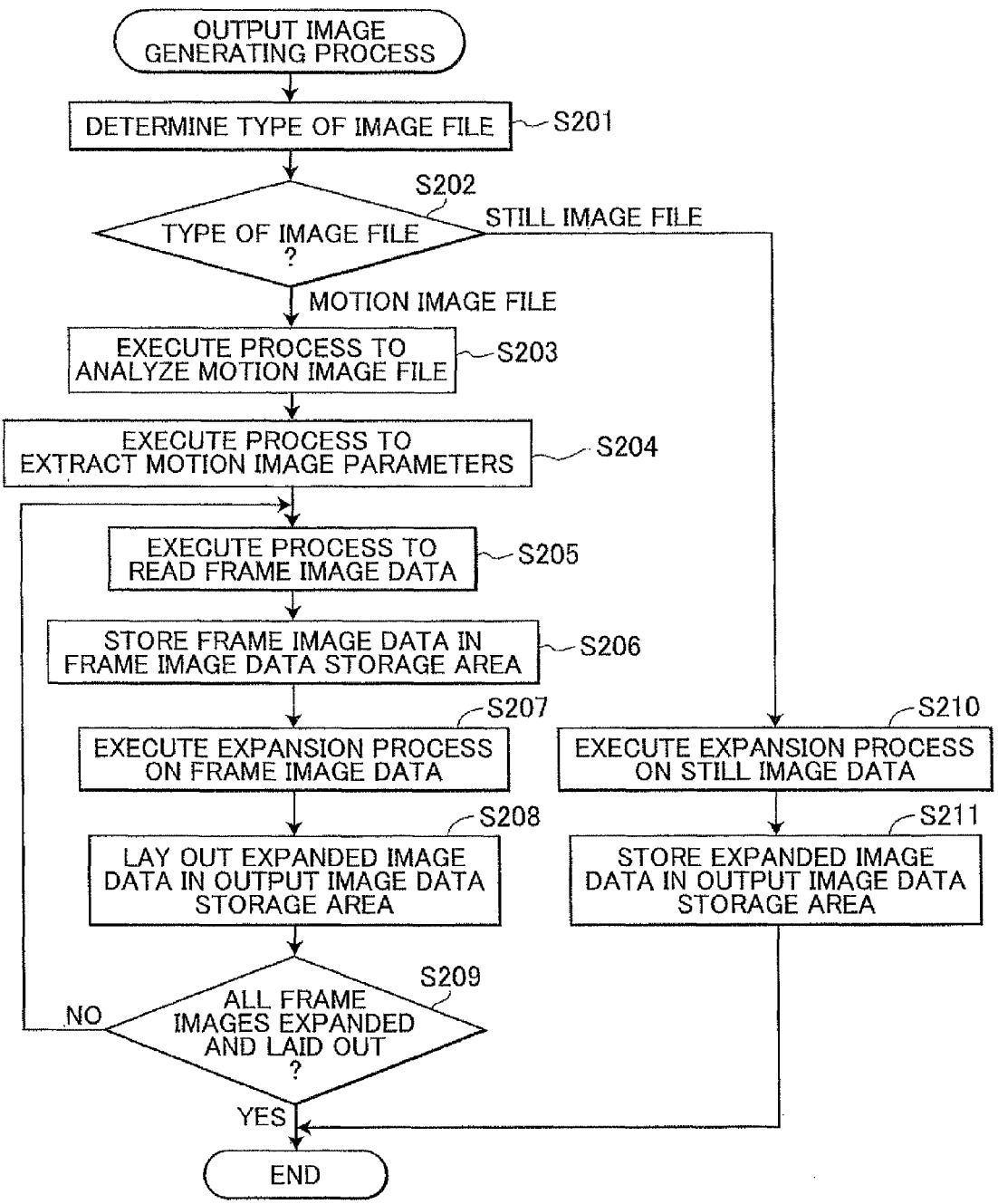

PRINTING DEVICE CAPABLE OF DISPLAYING THUMBNAIL IMAGE OF IMAGE FILE

CROSS REFERENCE TO RELATED APPLICATION

This application claims priority from Japanese Patent Application No. 2008-304803 filed Nov. 28, 2008. The entire content of the priority application is incorporated herein by reference.

TECHNICAL FIELD

The present invention relates to a printing device for printing images based on data in an image file.

BACKGROUND

A conventional printing device well known in the art reads image files representing photographs or other still images (still image files) from a storage medium, and prints out the still images represented by the image files. Recently, there have also been proposals for printing devices capable of printing out not only still image files, but also image files representing motion images (motion image files).

Since a motion image represented by a motion image file is configured of an enormous number of frame images, making it impractical to print all of the frame images, the printing device prints only specific frame images extracted from the file. The printing device is configured to be able to printing a plurality of frame images extracted from a motion image file in an arrangement on a single page, for example.

The conventional printing device is also configured to display a selection screen including a plurality of image files read from the storage medium, prompting the user to select a desired image file to print. The printing device can also display the first frame image of a motion image file as a thumbnail image. When the user selects a motion image file in the selection screen, the printing device prompts the user to specify frame images to print from the motion image file, and subsequently extracts and prints the specified frame images.

However, the conventional printing device described above displays only a thumbnail image of one frame image from the motion image file. Since this frame image may differ from the images that the user will actually be printing, the user must select an image file without knowing exactly what images are available for printing in the motion image file. Thus, in some cases the user will not find a desired printed image in the selected image file and must search through several image files in an effort to find the desired image.

SUMMARY

In view of the foregoing, it is an object of the present invention to provide a printing device that can assist the user in more efficiently selecting image files from which desired images can be obtained for printing.

In order to attain the above and other objects, there is provided a printing device including: an inputting unit that is configured to be capable of inputting at least one image file, each image file representing a motion image; a generating unit that is configured to extract a plurality of frame images from each image file and to generate, for each image file, data of a first output image in which the plurality of extracted frame images are laid out on a single page; a display unit that is configured to display a selection screen in which the display unit displays at least one first display image corresponding to the at least one first output image; a selecting unit that is configured to select one of the at least one first display image displayed; and a printing unit that is configured to print a first output image corresponding to the first display image selected in the selection screen.

According to another aspect of the present invention, there is provided a storage medium storing a program executable on a printing device. The program is provided with a set of program instructions including: inputting at least one image file, each image file representing a motion image; extracting a plurality of frame images from each image file and generating, for each image file, a first output image in which the plurality of extracted frame images are laid out on a single page; displaying a selection screen in which at least one first display image corresponding to the at least one first output image is displayed; selecting one of the at least one first display image displayed in the selection screen; and printing a first output image corresponding to the first display image selected in the selection screen.

According to further aspect of the present invention, there is provided a storage medium storing a program executable on a computer. The program is provided with a set of program instructions including: inputting at least one image file, each image file representing a motion image; extracting a plurality of frame images from each image file and generating, for each image file, a first output image in which the plurality of extracted frame images are laid out on a single page; displaying a selection screen in which at least one first display image corresponding to the at least one first output image is displayed; selecting one of the at least one first display image displayed in the selection screen; and controlling a printing device to print a first output image corresponding to the first display image selected in the selection screen.

BRIEF DESCRIPTION OF THE DRAWINGS

In the drawings:

FIG. 4 is a view conceptually illustrating an input image data storage area of the RAM;

FIG. 5 is a view conceptually illustrating a motion image data storage area of the RAM;

FIG. 6A is an explanatory view showing types of file format of motion image files and corresponding numbers associated therewith;

FIG. 6B is an explanatory view showing types of codec of motion image files and corresponding numbers associated therewith;

FIG. 7 is a view conceptually illustrating an LCD position data storage area of the RAM;

FIG. 12 is a flowchart of an output image generation process in the media image printing process;

DETAILED DESCRIPTION

Figure 1:
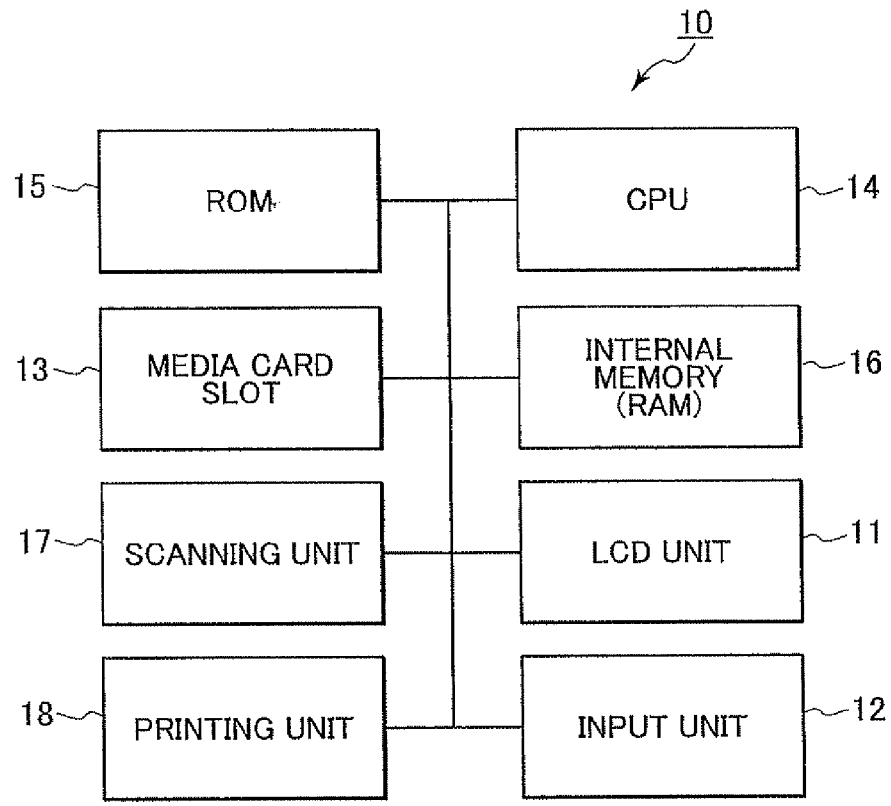
FIG. 1 is a block diagram illustrating an electrical configuration of a multifunctional device including a CPU, an internal memory (RAM) and an LCD unit.

First, a general configuration of a multifunctional peripheral 10 (hereinafter to be referred to as the "MFP 10") according to an embodiment of the present invention will be described with reference to FIG. 1.

The MFP 10 is provided with various functions, including a printer function, a scanner function, and a color copier function. As shown in FIG. 1, the MFP 10 is provided with a CPU 14, a ROM 15, an internal memory (RAM) 16, an LCD unit 11, an input unit 12, a media card slot 13, a scanning unit 17 and a printing unit 18 that are interconnected with each other by signal lines.

The CPU 14 performs all computations for the MFP 10. The ROM 15 has prestored programs that the CPU 14 executes in order to implement processes described later. The RAM 16 temporarily stores results of computations performed by the CPU 14, inputted data, and the like.

The LCD unit 11 displays images on a compact color liquid crystal display including images of character strings for messages.

The input unit 12 has various operating keys that the user can press, and inputs data based on the pressed keys. More specifically, the input unit 12 includes an Up key, a Down key, a Left, key, and a Right key for moving a cursor up, down, left, and right; and an OK key for accepting a selection. The LCD unit 11 and the input unit 12 serve as a user interface of the MFP 10.

The scanning unit 17 scans an image of a document placed on a platen and generates image data representing the scanned image. The printing unit 18 prints image data specified in a print command.

The media card slot 13 receives a media card inserted thereinto, such as an SD card and a CompactFlash card (portable, non-volatile storage media). The MFP 10 also has a direct print function for directly reading image files from a media card inserted in the media card slot 13 and printing images represented by the image files.

The image files discussed herein include both still image files representing still images; and motion image files representing motion images and configured of a plurality of frame images. When the image file to be printed is a motion image file, the MFP 10 extracts a prescribed number (nine in the present embodiment) of frame images from the plurality of frame images constituting the motion image represented by the motion image file, and prints an image (an output image) having the extracted frame images laid out on a single page (See FIG. 13A). When the image file to be printed is a still image file, the MFP 10 prints, as an output image, the still image represented by the still image file on a single page (See FIG. 13B).

Figure 2:
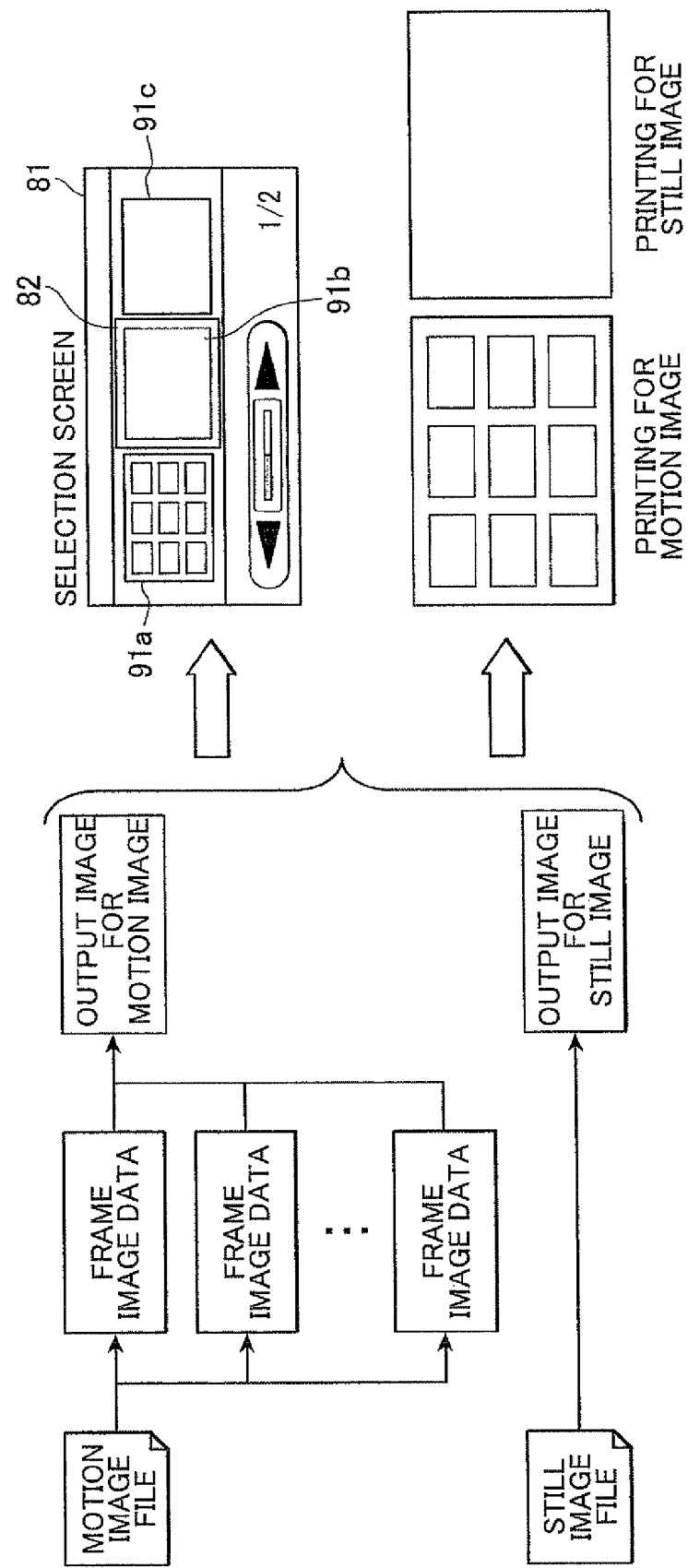
FIG. 2 is an overview illustrating a series of processes the multifunctional device performs.

The MFP 10 also displays a selection screen 81 such as that shown in FIG. 2 on the LCD unit 11, enabling the user to select an image file to be printed from among the plurality of image files stored on the media card and prints images represented by the selected image files. More specifically, the MFP 10 displays output images for all of the image files that are candidates for printing in the selection screen 81 as thumbnail images, from which thumbnail images the user can tell what the output images will look like when the image files are actually printed (hereinafter referred to as the "print images"). The thumbnail images representing still image files and motion image files are the same size.

Next, an overview of a series of processes executed by the MFP 10 will be described with reference to FIG. 2.

Figure 13A:
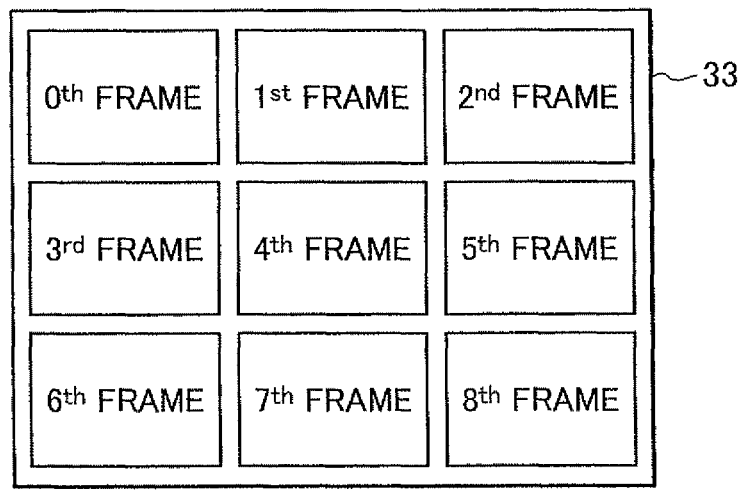
FIG. 13A is an explanatory view of an output image data storage area in which frame images extracted from a motion image file are laid out.
Figure 13B:
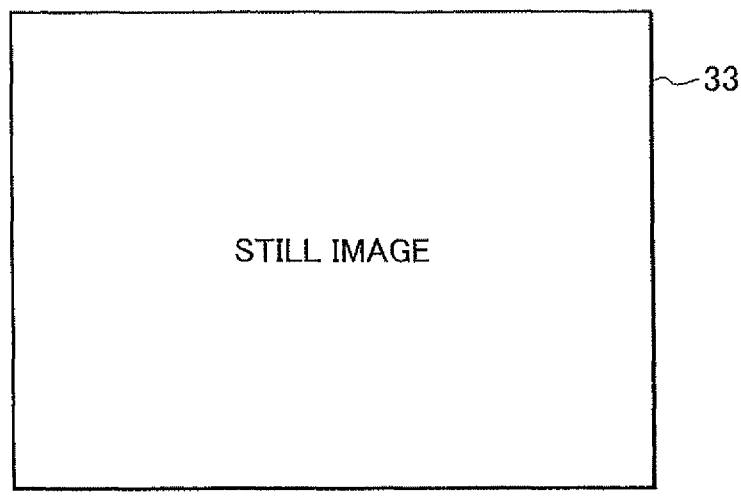
FIG. 13B is an explanatory view of the output image data storage area in which a still image is laid out.

In the processes, the MFP 10 extracts data for nine frame images from each motion image file and generates data of an output image by sequentially laying out each of the nine extracted frame images in a storage area (output image data storage area 33) representing a single page, as shown in FIG. 13A. The MFP 10 also generates data of an output image for each still image file in which only one still image represented by the still image file is laid out on a single page, as shown in FIG. 13B. Next, the MFP 10 displays the output image for each image file as a thumbnail image in the selection screen 81 after reducing or enlarging the output image to a prescribed size. When the user selects an image file, the MFP 10 prints the output image of the selected image file.

Next, storage areas of the RAM 16 will be described with reference to FIGS. 3 through 10.

Figure 3:
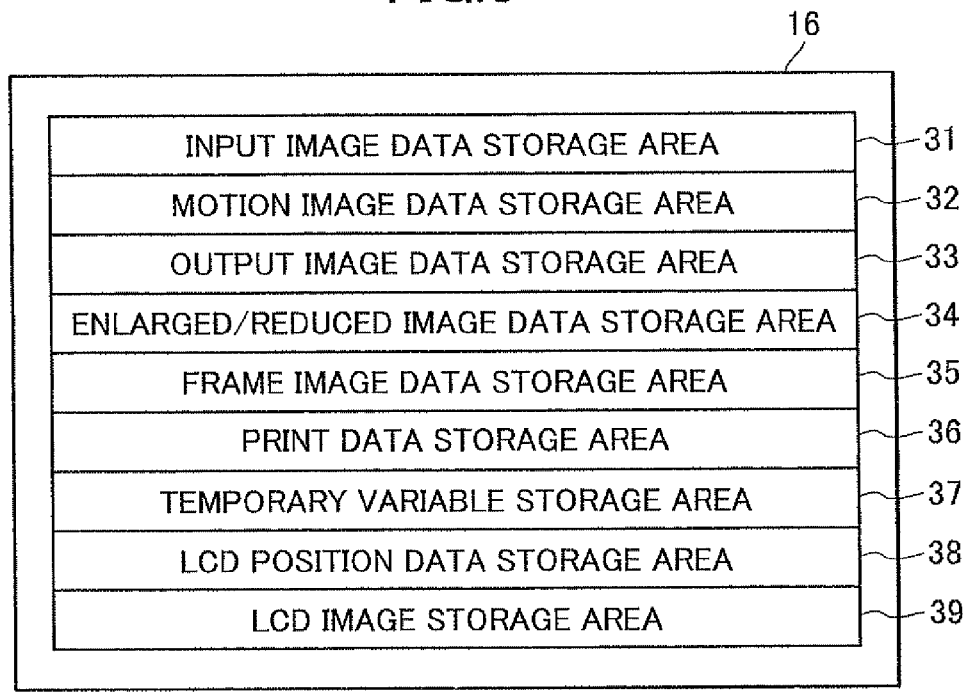
FIG. 3 is a conceptual diagram explaining storage areas of the RAM in the multifunctional device.

As shown in FIG. 3, the RAM 16 is configured with various storage areas for storing different types of data. The storage areas include an input image data storage area 31, a motion image data storage area 32, an output image data storage area 33, an enlarged/reduced image data storage area 34, a frame image data storage area 35, a print data storage area 36, a temporary variable storage area 37, an LCD position data storage area 38, and an LCD image storage area 39.

The input image data storage area 31 serves to store data on image files stored on a media card inserted in the media cart slot 13. As shown in FIG. 4, the input image data storage area 31 is divided into an input image ID storage area 51, an input image filename storage area 52, and an input image file size storage area 53.

The input image ID storage area 51 serves to store IDs for image files stored on the media card. The IDs are assigned sequentially beginning from 0 based on the number of image files (hereinafter referred to as "input image IDs"). The input image IDs are assigned to the image files in the order that the files are read from the media card.

The input image filename storage area 52 serves to store filenames of the image files. The input image filename storage area 52 is a 256-byte region, with each byte capable of storing data for one character.

The input image file size storage area 53 serves to store numerical values (values in units of kilobytes in this example) indicating the file sizes of the image files.

The motion image data storage area 32 serves to temporarily store data read from the media card for a motion image file being processed. As shown in FIG. 5, the motion image data storage area 32 is provided with a format type storage area 61, a codec type storage area 62, a horizontal size storage area 63, a vertical size storage area 64, a total frame number storage area 65, an extraction position data storage area 66 and an extraction size data storage area 67.

The format type storage area 61 stores data of a type of file format for the motion image file being processed. In the present embodiment, the format type storage area 61 may store one of the values 0, 1, or 2 that have been preassigned to one of three file formats, as shown in FIG. 6A.

The codec type storage area 62 stores data of a type of codec for the motion image file being processed. In the present embodiment, the codec type storage area 62 may store one of the values 0, 1, or 2 that have been preassigned to one of three types of codecs, as shown in FIG. 6B.

The horizontal size storage area 63 stores numerical data indicating the number of pixels in the horizontal direction of the motion image file (frame image) being processed.

The vertical size storage area 64 stores numerical data indicating the number of pixels in the vertical direction for the motion image file (frame image) being processed.

The total frame number storage area 65 stores numerical data indicating a total number of frame images (number of frames) constituting the motion image file being processed.

The extraction position data storage area 66 stores data identifying where each of nine frame images extracted from the motion image file being processed is positioned within the motion image file. More specifically, the extraction position data storage area 66 stores numerical values (values in units of bytes in this example) indicating an amount of offset from the beginning of the motion image file to the start of data for each frame image. A motion image file is configured of data for frame images arranged sequentially between header data at the beginning of the file and index data at the end of the file. Thus, the amount of offset is a value indicating the size of data from the start of the motion image file (the start of the header data in this case) to the start of frame image data targeted for extraction. The amount of offset is stored in units of bytes rather than kilobytes in order to accurately identify the position from which the frame image data begins.

In the present embodiment, the MFP 10 automatically identifies nine frame images, including the first image (the first frame), the last image (the last frame), and seven images (seven frames) distributed equally therebetween, by dividing the total number of frames in the motion image file in eight equal intervals. Specifically, the MFP 10 extracts the nine frame images from the motion image file in chronological order and lays out and prints these frame images in the same order. FIG. 13A illustrates the layout of nine frame images denoted as $0^{th}$ through $8^{th}$ frames. Further, rather than referencing the total number of frames, the motion image file may be divided into eight equal time intervals by referencing the playback time of the motion image, for example.

The extraction size data storage area 67 stores data sizes of the frame image data (in a compressed format) for the extracted nine frame images and also has nine storage areas like the extraction position data storage area 66. Each of these storage areas serves to store a numerical value (a value in units of bytes, for example) indicating the data size of the corresponding frame image.

The nine areas of the extraction position data storage area 66 are correlated with the nine areas of the extraction size data storage area 67. Thus storage areas with the same layout position hold data related to the same frame image.

The output image data storage area 33 serves to temporarily store output image data for a motion image file by sequentially laying out nine frame images extracted from the motion image file as shown in FIG. 13A, and to temporarily store output image data for a still image file by laying out one still image represented by the still image file as shown in FIG. 13B.

The enlarged/reduced image data storage area 34 serves to store enlarged/reduced image data generated by converting (expanding or reducing) the output image data to a predetermined thumbnail image size.

The frame image data storage area 35 serves to store frame image data extracted from a motion image file. The frame image data stored in this region is in a compressed state (the JPEG format, for example) and has not yet been expanded (decoded).

The print data storage area 36 serves to temporarily store print data for actual printing that has been produced by converting the output image data.

The temporary variable storage area 37 serves to temporarily store variables and counters, such as a page no. counter, cursor position counter, processing page no. variable, generated image counter, process frame image counter, output image pixel counter, and line counter. These variables and counters are used during various processes executed by the CPU 14, as will be described later.

The LCD position data storage area 38 serves to store data indicating a display page (described later) of the selection screen 81, and a display position at which each thumbnail image is to be positioned. As shown in FIG. 7, the LCD position data storage area 38 is provided with an input image ID storage area 71, a display page no. storage area 72, a display image position number storage area 73, a horizontal display coordinate storage area 74 and a vertical display coordinate storage area 75.

The input image ID storage area 71 stores input image IDs for the image files, which correspond to the input image IDs stored in the input image ID storage area 51 of the input image data storage area 31.

The display page no. storage area 72 stores, for each input image ID, a page number of the selection screen 81 on which the thumbnail image for the corresponding image file should be displayed. Since there is a limit to the number of thumbnail images that can be displayed simultaneously on the LCD unit 11 (three in the present embodiment), the user must switch among a plurality of pages of the selection screen 81 when the number of selectable image files exceeds this limit.

Figure 8A:
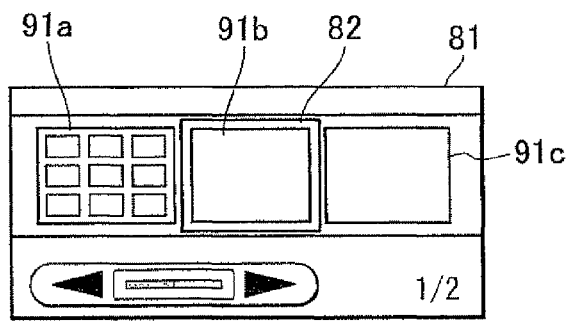
FIG. 8A is a view showing an example of a first page of a selection screen shown on the LCD unit of the multifunctional device.
Figure 8B:
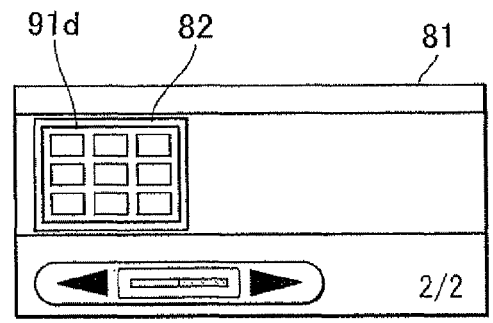
FIG. 8B is a view showing an example of a second page of the selection screen shown in the LCD unit of the multifunctional device.

The display image position number storage area 73 stores one of the numbers 0, 1, and 2 to indicate the position at which each thumbnail image should be displayed on the selection screen 81 ($0^{th}$, $1^{st}$ or $2^{nd}$ position from the left). Now assume that four image files are stored on the media card and are assigned input image IDs of 0, 1, 2 and 3. In this case, thumbnail images 91a, 91b and 91c for the image files having IDs of 0-2 are displayed on a first page of the selection screen 81 respectively at left, center and right positions, as shown in FIG. 8A, and the remaining thumbnail image 91d for the image file having ID of 3 is displayed at the left position on a second page, as shown in FIG. 8B.

The horizontal display coordinate storage area 74 stores data for a horizontal image layout starting point indicating a horizontal starting point at which each thumbnail image is to be displayed on the LCD unit 11.

Figure 9:
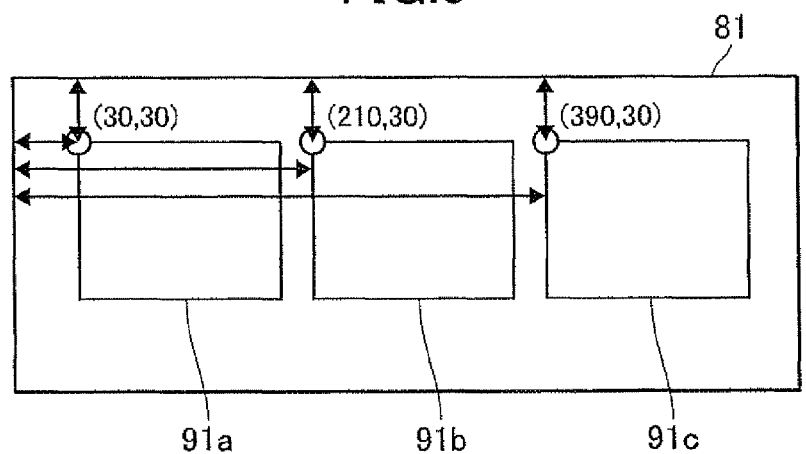
FIG. 9 is a view indicating, vertical and horizontal layout starting positions at which each thumbnail image is arranged to be displayed on the selection screen.

The vertical display coordinate storage area 75 stores data for a vertical image layout starting point indicating a vertical starting point at which each thumbnail image is to be displayed on the LCD unit 11. Each circle in FIG. 9 shows positions corresponding to each combination of coordinates stored in the horizontal display coordinate storage area 74 and the vertical display coordinate storage area 75.

Figure 10:
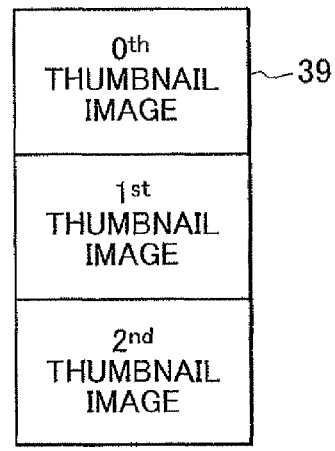
FIG. 10 is a view conceptually showing an LCD image storage area of the RAM.

The LCD image storage area 39 serves to store thumbnail images to be displayed simultaneously on the LCD unit 11. Specifically, as shown in FIG. 10, the LCD image storage area 39 has a plurality of sub-regions for storing thumbnail images, each sub-region being assigned one of the position numbers $0^{th}$, $1^{st}$ and $2^{nd}$ that correspond to the numbers (0, 1 and 2) stored in the display image position number storage area 73. The thumbnail images 91a, 91b, 91c are respectively stored in the sub-regions of the position numbers $0^{th}$, $1^{st}$, and $2^{nd}$, to display the first page of the selection screen 81. The thumbnail image 91d is stored in the sub-region of the position number $0^{th}$ to display the second page of the selection screen 81.

Next, processes executed by the CPU 14 will be described in detail with reference to FIGS. 11 through 15.

The CPU 14 of the MFP 10 performs the following processes (1)-(4):
(1) a media image printing process;
(2) an output image generating process;
(3) an LCD image generating process; and
(4) a printing process.

The CPU 14 executes the media image printing process (process (1) described above) when the user performs an operation on the input unit 12 to select a 'media image printing mode' while a media card storing image files is inserted in the media card slot 13. The other processes (2)-(4) are executed as subroutines called during the media image printing process.

Figure 11:
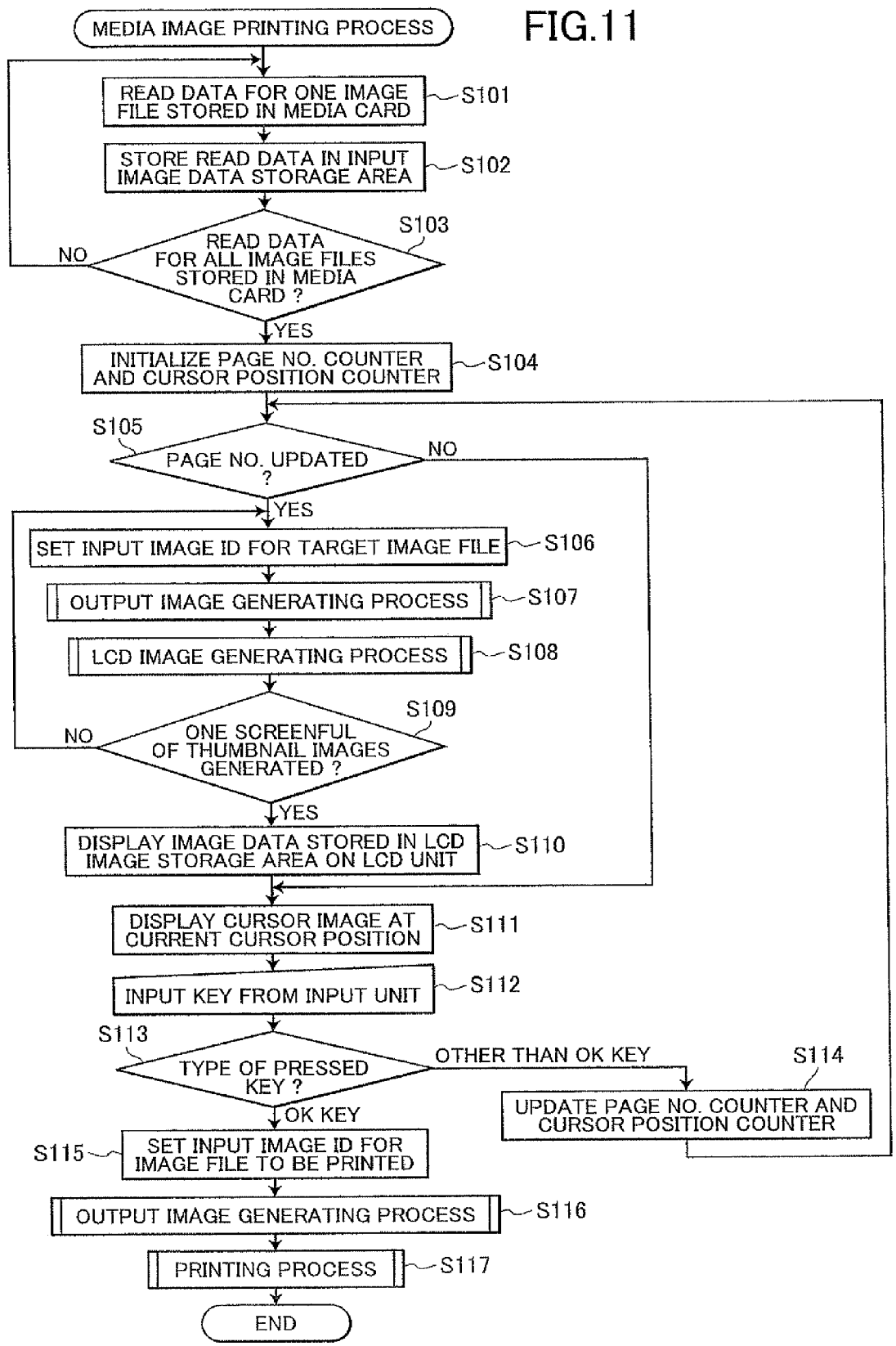
FIG. 11 is a flowchart of a media image printing process executed by the CPU of the multifunctional device.

First, the media image printing process executed by the CPU 14 of the MFP 10 will be described while referring to a flowchart in FIG. 11.

In S101 at the beginning of this media image printing process, the CPU 14 reads data (a filename and file size) for one image file stored in the media card.

In S102 the CPU 14 stores the data read in S101 in the input image data storage area 31 in association with one input image ID. The CPU 14 further stores the input image ID and display page and position data for the subject image file (data of a display page and position at which a thumbnail image for the subject image file should be displayed) in the input image ID storage area 71, the display page no. storage area 72, the display image position number storage area 73, the horizontal display coordinate storage area 74 and the vertical display coordinate storage area 75 in the LCD position data storage area 38.

In S103 the CPU 14 determines whether data for all image files stored in the media card has been re-ad.

If the CPU 14 determines that data for all image files has not been read (S103: NO), the CPU 14 returns to S101 and reads data for one of the remaining image files.

However, if data has been read for all image files (S103: YES), in S104 the CPU 14 initializes both of the page no. counter and the cursor position counter (prestored in the temporary variable storage area 37) to 0. The page no. counter represents on which page a cursor image 82 (see FIG. 8AB) is currently being located among all the pages available in the selection screen 81. The cursor position counter represents the position at which the cursor image 82 is currently being located, among the three thumbnail images simultaneously displayed on one page of the selection screen 81. The page no. counter and the cursor position counter are interlocked with the user's operations of the Up, Down, Left and Right keys in the input unit 12.

In S105 the CPU 14 determines whether the page no. of the selection screen 81 has been updated. Specifically, the processing page no. variable is prestored in the temporary variable storage area 37 for representing a page no. on which an image file currently being processed is located among all the pages available in the selection screen 81. The processing page no. variable is given an initial value of −1. The CPU 14 determines whether the page no. of the selection screen 81 has been updated by the user by comparing the value of the processing page no. variable with the value of the page no. counter, and judges that the page no. has been updated by the user when the two values are different. The processing page no. variable has been set to an initial value of −1 to ensure that the CPU 14 makes a YES determination the first time S105 is performed. After reaching a YES determination in S105, before executing the process of S106, the processing page no. variable is updated to match the value of the page no. counter.

When the CPU 14 determines that the values of the processing page no. variable and the page no. counter are different from each other, i.e., the CPU 14 determines that the page no. was updated by the user (S105: YES), in S106 the CPU 14 sets the input image ID of an image file to be processed (target image file). Here, specifically, the generated image counter has been stored in the temporary variable storage area 37 for counting how many output images have been generated for being displayed on one page of the selection screen 81. The CPU 14 assigns the input image ID for the target image file with an input image ID that is stored in the input image ID storage area 71 in association with a combination of the value in the display page no. storage area 72 that is equal to the value of the page no. counter and the value in the display image position number storage area 73 that is equal to the value of the generated image counter. The value stored in the generated image counter is always reset to 0 when the CPU 14 advances from S105 to S106.

In S107 the CPU 14 executes the output image generating process (process (2) described above) on a targeted image file whose input ID has been set in S106. In S107, the CPU 14 generates output image data for the targeted image file (image data representing an image to be printed) in the output image data storage area 33. Details of the output image generating process will be described later with reference to FIG. 12.

In S108 the CPU 14 executes the LCD image generating process (process (3) described above) on the output image data stored in the output image data storage area 33 (as a result of the output image generating process executed in S107) to generate a thumbnail image for the targeted image file and stores the thumbnail image in the LCD image storage area 39 at a position having the position number indicated by the generated image counter. Details of the LCD image generating process will also be described later.

In S109 the CPU 14 determines whether one screenful of thumbnail images has been generated. The CPU 14 increments the generated image counter by 1 in S109 upon determining that one screenful of thumbnail images has not been generated (S109: No) and returns to S106 to generate another thumbnail image.

Specifically, in S109 the CPU 14 determines whether one screenful of thumbnail images has been generated based on whether the value of the generated image counter has reached the maximum number of images that can be displayed in one screen (since three images can be displayed simultaneously in the selection screen 81 in the present embodiment, the maximum image number is set to two because the initial value of the generated image counter is 0).

Further, if there are less than three thumbnail images in the last page to be displayed on the selection screen 81, the CPU 14 determines that one screenful of thumbnail images has been generated by referring to the input image ID in addition to the value of the generated image counter. If the input image ID indicates the target image file is the last file, even though the value of the generated image counter does not reach the maximum number (i.e., the current value of the generated image counter remains either 0 or 1 in this example), the CPU 14 does not endlessly repeat the process S106-S109 but determines that one screenful of thumbnail images has been generated in S109.

When one screenful of thumbnail images is determined to have been generated (S109: YES), in S110 the CPU 14 displays the image data stored in the LCD image storage area 39 on the LCD unit 11, and subsequently advances to S111.

The CPU 14 also jumps to S111 after determining in S105 that the page no. was not updated by the user.

In S111 the CPU 14 displays a cursor image 82 on the selection screen 81 at a position associated with the cursor position counter. As shown in FIGS. 8A and 8B, the cursor image 82 in the present embodiment is a yellow border surrounding a thumbnail image displayed on the selection screen 81 in the LCD unit 11.

In S112 the CPU 14 receives data inputted from the input unit 12 when the user presses an operating key in the input unit 12.

In S113 the CPU 14 determines based on the data inputted in S112 whether the pressed key was the OK key or another key, such as the Up key, Down key, Left key, or Right key.

If the CPU 14 determines in S113 that the pressed key was a key other than the OK key, in S114 the CPU 14 updates the page no. counter and/or the cursor position counter.

For example, when the pressed key was the Down key or Right key, the CPU 14 increments the cursor position counter by 1 in order to move the position of the cursor image 82 rightward one place. However, if the value of the cursor position counter exceeds the maximum value (2 in the present embodiment since the counter was initially set to 0) as a result of this increment, such as when the Down key or Right key was pressed when the cursor image 82 is in the rightmost position, the CPU 14 resets the cursor position counter to 0 and increments the page no. counter by 1. In this case, if the value of the page no. counter would exceed the maximum value (the page number of the last page −1, since the counter is initially set to 0) as a result of this increment, i.e., when there is no next page, the CPU 14 maintains the page no. counter at the maximum value without incrementing the counter.

On the other hand, if either the Up key or Left key was pressed in S113, the CPU 14 decrements the cursor position counter by 1 in order to move the position of the cursor image 82 leftward one place. In this case, if the value of the cursor position counter would be less than 0 following this decrementing operation, such as when the Up key or Left key was pressed when the cursor image 82 was already in the leftmost position, the CPU 14 resets the cursor position counter to 0 and decrements the page no. counter by 1. In this case, if the value of the page no. counter would be less than 0 as a result of the decrementing operation, i.e., when no previous page exists, the CPU 14 maintains the value of the page no. counter at 0 without decrementing the counter.

The CPU 14 returns to S105 after finishing S114.

However, if the CPU 14 determines in S113 that the pressed key was the OK key, in S115 the CPU 14 assigns the input image ID for an image file to be printed with an input image ID that is stored in the input image ID storage area 71 in association with a combination of the value of the display page no. storage area 72 that is equal to the current value of the page no. counter and the value of the display image position number storage area 73 that is equal to the current value of the cursor position counter.

In S116 the CPU 14 executes the output image generating process on the image file having the input image ID set as the printing target in S115. As a result of this process, output image data for the targeted image file (image data representing the print image) is generated in the output image data storage area 33.

In S117 the CPU 14 executes the printing process (process (4) described above) on the output image data stored in the output image data storage area 33 as a result of the output image generating process executed in S116 and subsequently ends the current media image printing process. Details of the printing process will also be described later.

Next, the output image generating process (process (2) described above) executed in S107 and S116 of the media image printing process will be described with reference to a flowchart in FIG. 12. The output image generating process is configured to be executed in S107 on the image file whose ID has been set in S106 to be displayed on the selection screen 81, while to be performed in S116 on the image file whose ID has been set in S115 as a target to be printed.

In S201 at the beginning of the output image generating process, the CPU 14 determines the type of the targeted image file by referencing the header data therein. Specifically, the CPU 14 refers to the filename stored in the input image filename storage area 52 in association with the ID of the targeted image file in the input image data storage area 31. By using the filename, the CPU 14 directly accesses the target image file stored on the media card and refers to the header data therein.

In S202 the CPU 14 determines whether the type of image file determined in S201 is classified as a still image file or a motion image file.

If the CPU 14 determines in S202 that the image file is a motion image file, then in S203 the CPU 14 executes a process to analyze the motion image file. Through this analytical process, the CPU 14 acquires format type data and codec type data for the motion image file. The CPU 14 stores these data respectively in the format type storage area 61 and codec type storage area 62 of the motion image data storage area 32 (See FIG. 5).

In S204 the CPU 14 executes a process to extract motion image parameters from the motion image file. Through this extraction process, the CPU 14 acquires horizontal size data, vertical size data, and total frame number data for the motion image file; and the extraction position data and extraction size data for each of the nine frames to be extracted. The CPU 14 stores these data respectively in the horizontal size storage area 63, vertical size storage area 64, total frame number storage area 65, extraction position data storage area 66, and extraction size data storage area 67 of the motion image data storage area 32, as shown in FIG. 5. If data for a different motion image file has already been stored in the motion image data storage area 32 at this time, the CPU 14 first deletes the existing data before storing the data for the motion image file currently being processed (overwrites the existing data).

In S205 the CPU 14 performs a process to read, from the motion image file, data of a frame image to be processed from among the nine frame images ($0^{th}$ through $8^{th}$ frames) based on the extraction position data and extraction size data stored in the extraction position data storage area 66 and extraction size data storage area 67, respectively. Here, the process frame image counter prestored in the temporary variable storage area 37 is given an initial value of 0, and the CPU 14 targets data for the frame image corresponding to the value of the process frame image counter. As will be described later, the value of the process frame image counter is incremented after processing data for each frame image.

In S206 the CPU 14 stores the frame image data read in S205 in the frame image data storage area 35.

In S207 the CPU 14 performs an expansion (decoding) process on the frame image data stored in the frame image data storage area 35 and converts this data to a format in which pixel calculations are possible (such as image data expressing RGB values for each pixel as numerical values from 0 to 255).

In S208 the CPU 14 stores or lays out the pixel data expanded in S207 at a position in the output image data storage area 33 corresponding to the frame image being processed. When executing S208, if output image data for another image file has already been stored in the output image data storage area 33, the CPU 14 first deletes the existing output image data before storing the new output image data for the currently targeted image file (i.e., overwrites the existing data).

In S209 the CPU 14 determines whether the expansion process and layout process have been performed for all frame images. Specifically, the CPU 14 increments the process frame image counter by 1 each time processing of S207-S208 for one frame image is completed. The CPU 14 determines that the expansion process and layout process have been performed on all frame images when the value of the process frame image counter reaches the value (the number of frame images to be laid out −1), i.e., eight in the present embodiment.

If the CPU 14 determines that the expansion process and layout process have not been completed for all frame images (S209: NO), the CPU 14 returns to S205 and repeats the above process on data for an unprocessed frame image By repeatedly executing the processes of S205-S209, the CPU 14 lays out the nine frame images in their order of extraction (i.e., based on their positional order in the motion image), as illustrated in FIG. 13A. In the present embodiment, a margin is provided around each frame image when the frame images are laid out, but this margin is not necessarily required.

However, if the CPU 14 determines that the expansion process and layout process have been completed for all frame images (S209: YES), the CPU 14 ends the current output image generating process. At this time, the image data stored in the output image data storage area 33 (pixel data representing an image in which nine frame images are laid out) is the output image data for the motion image file.

On the other hand, if the CPU 14 determines in S202 described above that the image file is a still image file, then in S210 the CPU 14 performs an expansion process on the still image file to convert the image data in the still image file to a format in which pixel calculations are possible.

In S211 the CPU 14 stores the image data expanded in S210 in the output image data storage area 33, and subsequently ends the current output image generating process. In other words, for still image files, unlike motion image files, a single still image is laid out in the output image data storage area 33, as illustrated in FIG. 13B. At this time, the image data stored in the output image data storage area 33 (pixel data representing a still image) is the output image data for the still image file.

Figure 14:
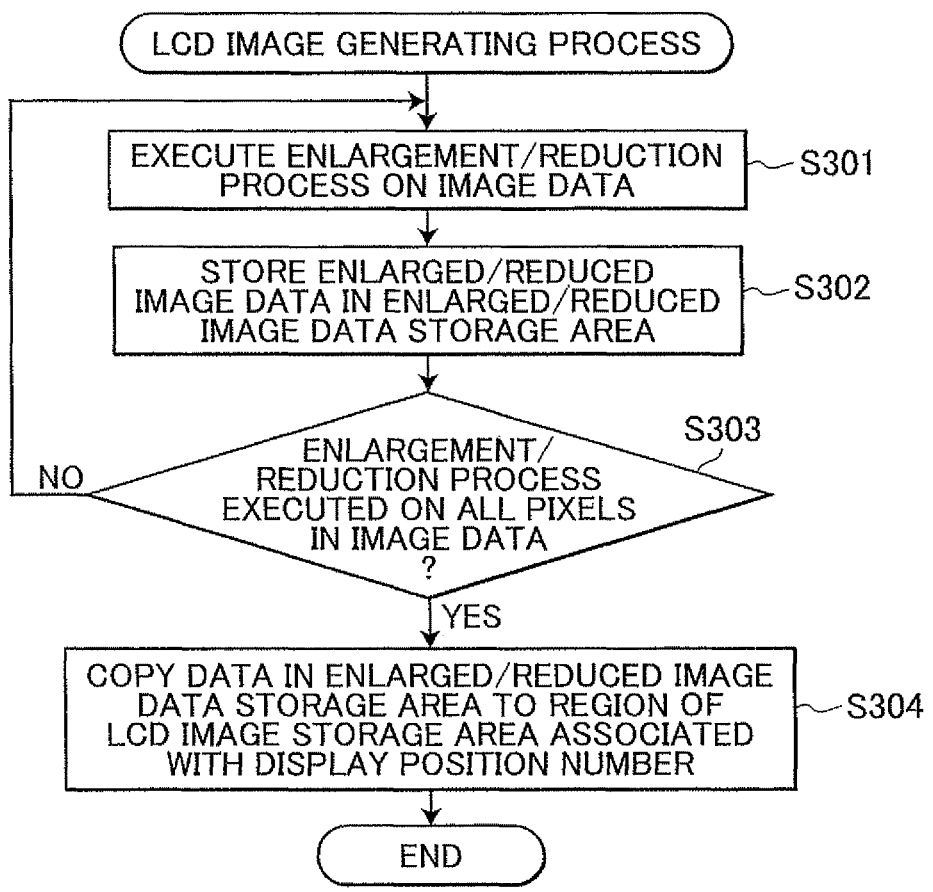
FIG. 14 is a flowchart of an LCD image generating process in the media image printing process.

Next, the LCD image generating process (process (3) described above) executed in S108 of the media image printing process will be described with reference to a flowchart in FIG. 14. The LCD image generating process is configured to be executed on the output image data that has been generated in S107 for the targeted image file whose ID has been set in S106.

In S301 at the beginning of the LCD image generating process, the CPU 14 executes a process to enlarge or reduce the targeted image data (the output image data stored in the output image data storage area 33). Here, through this enlargement/reduction process, the CPU 14 generates an enlarged/reduced image (thumbnail image) by converting (enlarging or reducing) the targeted image data to a predetermined size for thumbnail images. The CPU 14 determines whether to execute an enlargement process or a reduction process by comparing the pixel size of the targeted image data with the pixel size of thumbnail images to be displayed on the LCD unit 11.

Usually the reduction process is performed on the targeted image data since the pixel size of the targeted image data is normally greater than that of the thumbnail images. However, conceivably, the pixel size of the output image data could be smaller than that of the thumbnail images, in which case the enlargement process would be executed on the targeted image data. It is also conceivable that the pixel size of the targeted image data could be the same as that of the thumbnail images, in which case it is not necessary to perform an enlargement or reduction process on the image data. The enlargement and reduction processes are performed using well known algorithms, such as the nearest neighbor algorithm, bilinear algorithm, or bicubic algorithm, to generate an enlarged/reduced image one pixel at a time.

In S302 the CPU 14 stores the image data resulting from the enlargement/reduction process of S301 in the enlarged/reduced image data storage area 34.

In S303 the CPU 14 determines whether the enlargement/reduction process has been executed on all pixels in the targeted image data. In the present embodiment, the output image pixel counter has been prestored in the temporary variable storage area 37 for counting the number of pixels on which the enlargement/reduction process has already been completed. The output image pixel counter is given an initial value of 0. The CPU 14 increments this output image pixel counter by one each time the process in S301 is performed. The CPU 14 determines that the enlargement/reduction process has been executed for all pixels in the targeted image when the value of the output image pixel counter reaches the number of pixels in the targeted image data.

The CPU 14 returns to S301 upon determining in S303 that the enlargement/reduction process has not been executed for all pixels in the targeted image (S303: No).

However, if the CPU 14 determines that the enlargement/reduction process has been completed for all pixels (S303: YES), in S304 the CPU 14 copies the data stored in the enlarged/reduced image data storage area 34 to a region of the LCD image storage area 39 that is associated with a display position number for the targeted image file (see FIG. 10) which is indicated by the current value of the generated image counter. Subsequently, the CPU 14 ends the LCD image generating process.

Figure 15:
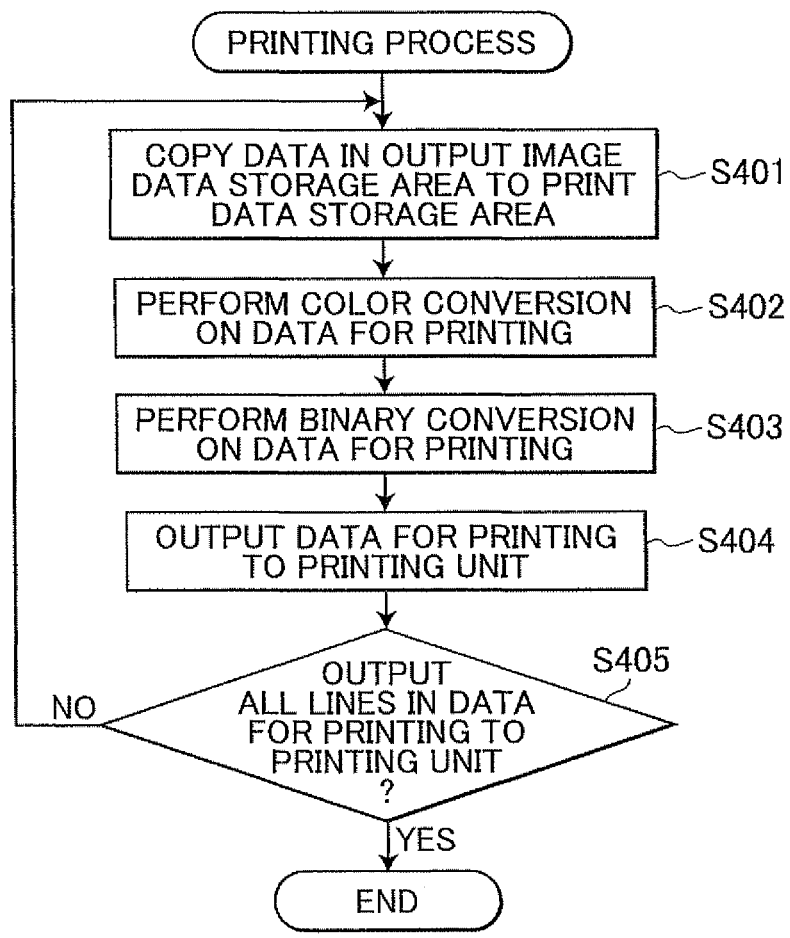
FIG. 15 is a flowchart of a printing process in the media image printing process.

Next, the printing process (process (4) described above) executed in S117 of the media image printing process will be described with reference to a flowchart in FIG. 15, The printing process is executed on the output image data generated and stored in the output image data storage area 33 in S116.

In S401 at the beginning of the printing process, the CPU 14 copies one line worth of the output image data stored in the output image data storage area 33 to the print data storage area 36. If the size of the output image is 1600 pixels horizontally× 1200 pixels vertically, for example, one line would be 1600×1 pixels.

In S402 the CPU 14 performs color space conversion for converting pixel data in the print data storage area 36 from RGB values to CMYK values. More specifically, the CPU 14 performs an RGB→CMY conversion on the pixel data using a color conversion method well known in the art, and performs CMY→CMYK conversion on the resulting data using a GCR process well known in the art.

In S403 the CPU 14 converts the pixel data in the print data storage area 36 to binary data for printing in each of the CMYK colors. This binary conversion is performed using processes well known in the art, such as the error diffusion method and dither matrix method.

In S404 the CPU 14 outputs the binary data produced in S403 to the printing unit 18, whereby the printing unit 18 performs a printing operation based on this binary data.

In S405 the CPU 14 determines whether the above process has been completed for all lines of the output image data. In the present embodiment, the line counter having an initial value of 0 has been prestored in the temporary variable storage area 37. The CPU 14 increments this line counter by one each time the process described above has been completed for one line. The CPU 14 determines whether the process has been completed for all lines of the output image data when the value of the line counter reaches the number of lines of the output image data stored in the output image data storage area 33.

The CPU 14 returns to S401 when determining in S405 that there remain lines to be processed (S405: No).

When the process has been completed for all lines (S405: YES), the CPU 14 ends the current printing process.

As described above, the MFP 10 according to the present embodiment displays the selection screen 81 with which a user can select an image file to print. The MFP 10 displays images in the selection screen 81 for selecting image files that are candidates for printing. The displayed images give the user a good idea of what the actual printed image will look like if the image file is selected. Accordingly, the user of the MFP 10 can more effectively select image files to obtain desired printed images.

In other words, if only a thumbnail image of one frame image from the motion image file were displayed, this frame image may differ from the images that the user will actually be printing. Hence, the user must select an image file without knowing exactly what images are available for printing in the motion image file. Thus, in some cases the user will not find a desired printed image in the selected image file and must search through several image files in an effort to find the desired image. The MFP 1 according to the present embodiment solves this problem by displaying images the same as print images in the selection screen 81 for selection.

Further, since the MFP 10 of the present embodiment can print an image in which a plurality of frame images has been laid out on the same page, the MFP 10 is configured to display an image having a combination of frame images as a thumbnail image for selection. Arranging a plurality of frame images on a single page also enables the user to more easily identify the content of a motion image than when only one frame image of the motion image is displayed as a selectable image. Printing a plurality of images on a single page is more suited to motion images than still images, particularly when the frame images of the motion image are smaller in size than the still images, since frame images of a motion image may appear grainy and poorer in quality when printed at an enlarged size.

The MFP 10 of the present embodiment can also allow the user to select an image file to be printed from among a combination of motion image files and still image files. This eliminates the inconvenience of having to select motion image files and still image files using different modes when both file types are stored on the same media card.

Further, since the MFP 10 of the present embodiment displays a row of thumbnail images for a plurality of image files in the selection screen 81 as selectable images, the user can compare output images of different image files when selecting an image file to print.

While the present invention has been described in detail with reference to the embodiment thereof, it would be apparent to those skilled in the art that various changes and modifications may be made therein without departing from the spirit of the invention.

For example, the MFP 10 according to the present embodiment described above automatically identifies nine frame images to be extracted from a motion image file, but the present invention is not limited to this configuration. For example, the MFP 10 may prompt the user to select which frame images are to be extracted. Further, the number of frame images to be extracted from a motion image file is not limited to nine and need not be fixed to any specific number. The user may be prompted to specify the number of frame images to be extracted.

Further, the present invention has been applied to a multifunctional peripheral as an example of printing devices according to the present embodiment, but the present invention may also be applied to a printing device other than a multifunctional device, such as a printer without scanning function.

Further, the present invention may also be applied to a computer connectable with a printing device. In this case, a driver program for controlling operations of the connected printing device is installed on a ROM, an HDD or the like in the computer. By executing the driver program, the computer performs the above-described processes (1) to (4), just like the MFP 10. That is, the computer reads image files (motion image files and still image files) from a media card inserted in the computer, generates output images for each image file, displays thumbnail images corresponding to the output images on a display unit of the computer for selection, and controls the printing device to print an output image corresponding to the thumbnail image selected by a user. The driver program may be originally stored on a recording medium, such as a CD-ROM, and installed on the computer.

What is claimed is:

1. An image processing apparatus comprising:
a processor; and
a memory storing a set of computer readable program instructions therein, the computer-readable program instructions, when executed by the processor, causing the image processing apparatus to:
retrieve a first image file representing a motion image and a second image file representing a still image;
generate, from the first image file, a first single image in which $N^2$ frame images extracted from the first image file are laid out two-dimensionally in N rows and in N columns, where N is an integer larger than one, the $N^2$ frame images being smaller in size than the first single image;
display the first single image and a second image adjacent to each other and at a same size as each other on a display device, the second single image representing the still image from the second image file;
accept a selection of one from among the first single image and the second single image which are displayed as a target image for printing; and
generate print data to be used for printing after accepting the selection, the print data corresponding to the target image.

2. The image processing apparatus according to claim 1, further comprising an identifying unit configured to identify which of a motion image and a still image is represented by an image file,
wherein, if the identifying unit identifies the image file as the second image file representing a still image, the display image generating unit generates the second single image; and wherein, if the identifying unit identifies the image file as the first image file representing a motion image, the display image generating unit generates the first single image.

3. The image processing apparatus according to claim 1, wherein the display control unit displays the first single image and the second single image as being arranged in line on the display device.

4. The image processing apparatus according to claim 1, wherein the display image generating unit is configured to generate, from the second image file, the second single image.

5. The image processing apparatus according to claim 1, wherein:
the retrieving unit is configured to retrieve a plurality of first image files each representing a motion image;
the display image generating unit is configured to generate a plurality of first single images, each first single image being generated from each of the plurality of first image files retrieved by the retrieving unit, respectively;
the display control unit is configured to display the plurality of first single images and the second single image adjacent to one another and at the same size as each other on the display device; and
the selection accepting unit is configured to accept the selection of one from among the plurality of first single images and the second single image displayed by the display control unit as the target image for printing.

6. The image processing apparatus according to claim 1, wherein:
the display image generating unit is configured to generate a first output image in which the $N^2$ frame images extracted from the first image file are laid out two-dimensionally in N rows and in N columns, where N is an integer larger than one, the $N^2$ frame images being smaller in size than the first output image and to generate the first single image by enlarging or reducing the first output image; and
the printing data generation unit generates the print data based on the first output image.

7. The image processing apparatus according to claim 1, wherein the displayed first single image and the displayed second single image are thumbnail images.

8. A method of controlling an image processing apparatus, the method comprising:
retrieving a first image file representing a motion image and a second image file representing a still image;
generating, from the first image file, a first single image in which $N^2$ frame images extracted from the first image file are laid out two-dimensionally in N rows and in N columns, where N is an integer larger than one, the $N^2$ frame images being smaller in size than the first single image;
displaying the first single image and a second single image adjacent to each other and at a same size as each other on a display device, the second single image representing the still image from the second image file;
accepting a selection of one from among the first single thumbnail image and the second single image which are displayed as a target image for printing; and
generating print data to be used for printing after accepting the selection, the print data corresponding to the target image.

9. A non-transitory storage medium storing a program executable on a computer connectable to a printing device, the program including a set of program instructions comprising:
retrieving a first image file representing a motion image and a second image file representing a still image;
generating, from the first image file, a first single image in which $N^2$ frame images extracted from the first image file are laid out two-dimensionally in N rows and in N columns, where N is an integer larger than one, the $N^2$ frame images being smaller in size than the first single image;
displaying the first single image and a second single image adjacent to each other and at a same size as each other on a display device, the second single image representing the still image from the second image file;
accepting a selection of one from among the first single image and the second single image which are displayed as a target image for printing;
generating print data to be used for printing at the printing device after accepting the selection, the print data corresponding to the target image; and
controlling the printing device to print the print data.

10. The non-transitory storage medium according to claim 9, wherein the set of program instructions further comprises identifying which of a motion image and a still image is represented by an image file,
wherein, if the image file is identified as the second image file representing a still image, the second single image is generated; and
wherein, if the image file is identified as the first image file representing a motion image, the first single image is generated.

11. The non-transitory storage medium according to claim 9, wherein the first single image and the second single image are displayed as being arranged in line on the selection screen.

12. An image processing apparatus comprising:
a processor; and
a memory storing a set of computer readable program instructions therein, the computer-readable program instructions, when executed by the processor, causing the image processing apparatus to:
retrieve a first image file representing a motion image and a second image file representing a still image;
generate, from the first image file, a first single image in which a plurality of frame images extracted from the first image file are laid out, the plurality of frame images being smaller in size than the first single image;
display the first single image and a second image adjacent to each other and at a same size as each other on a display device, the second single image representing the still image from the second image file;
accept a selection of one from among the first single image and the second single image which are displayed as a target image for printing; and
generate print data to be used for printing after accepting the selection, the print data corresponding to the target image, the memory further storing a set of computer readable program instructions therein, the computer-readable program instructions, when executed by the processor, further causing the image processing apparatus to:
retrieve a plurality of first image files, each representing a motion image and a plurality of second image files, each representing a still image;
generate a plurality of first single images, each first single image being generated from a respective first image file of the plurality of first image files retrieved;
display a plurality of pages including a first page and a second page, each at a time on a display device;

display a first-page first single image and a first-page second single image adjacent to each other on the first page, and a second-page first single image and a second-page second single image adjacent to each other on the second page, the first-page first single image being one of the plurality of first single images and the second-page first single image being another one of the plurality of first single images, the first-page second single image being one of a plurality of second single images and the second-page second single image being another one of the plurality of second single images, each of the second single images representing one of the still images from the second image files;

generate the second-page first single image upon receipt of a command to switch the first page to the second page while the first page is displayed; and switch display of the first page to display of the second page and display the second page.

13. A method of controlling an image processing apparatus, the method comprising:

retrieving a first image file representing a motion image and a second image file representing a still image;

generating, from the first image file, a first single image in which a plurality of frame images extracted from the first image file are laid out, the plurality of frame images being smaller in size than the first single image;

displaying the first single image and a second single image adjacent to each other and at a same size as each other on a display device, the second single image representing the still image from the second image file;

accepting a selection of one from among the first single thumbnail image and the second single image which are displayed as a target image for printing; and generating print data to be used for printing after accepting the selection, the print data corresponding to the target image, wherein the method further comprises:

retrieving a plurality of first image files, each representing a motion image and a plurality of second image files, each representing a still image;

generating a plurality of first single images, each first single image being generated from a respective first image file of the plurality of first image files retrieved;

displaying a plurality of pages including a first page and a second page, each at a time on a display device;

displaying a first-page first single image and a first-page second single image adjacent to each other on the first page, and a second-page first single image and a second-page second single image adjacent to each other on the second page, the first-page first single image being one of the plurality of first single images and the second-page first single image being another one of the plurality of first single images, the first-page second single image being one of a plurality of second single images and the second-page second single image being another one of the plurality of second single images, each of the second single images representing one of the still images from the second image files;

generating the second-page first single image upon receipt of a command to switch the first page to the second page while the first page is displayed; and switching display of the first page to display of the second page and display the second page.

14. A non-transitory storage medium storing a program executable on a computer connectable to a printing device, the program including a set of program instructions comprising:

retrieving a first image file representing a motion image and a second image file representing a still image;

generating, from the first image file, a first single image in which a plurality of frame images extracted from the first image file are laid out, the plurality of frame images being smaller in size than the first single image;

displaying the first single image and a second single image adjacent to each other and at a a same size as each other on a display device, the second single image representing the still image from the second image file;

accepting a selection of one from among the first single image and the second single image which are displayed as a target image for printing;

generating print data to be used for printing at the printing device after accepting the selection, the print data corresponding to the target image; and controlling the printing device to print the print data, the program further including a set of program instructions comprising:

retrieving a plurality of first image files, each representing a motion image and a plurality of second image files, each representing a still image;

generating a plurality of first single images, each first single image being generated from a respective first image file of the plurality of first image files retrieved;

displaying a plurality of pages including a first page and a second page, each at a time on a display device;

displaying a first-page first single image and a first-page second single image adjacent to each other on the first page, and a second-page first single image and a second-page second single image adjacent to each other on the second page, the first-page first single image being one of the plurality of first single images and the second-page first single image being another one of the plurality of first single images, the first-page second single image being one of a plurality of second single images and the second-page second single image being another one of the plurality of second single images, each of the second single images representing one of the still images from the second image files;

generating the second-page first single image upon receipt of a command to switch the first page to the second page while the first page is displayed; and switching display of the first page to display of the second page and display the second page.

* * * * *